March 8, 1927.
W. T. VAN ORMAN
1,620,415
LEAKPROOF TANK COVER
Original Filed April 28, 1921
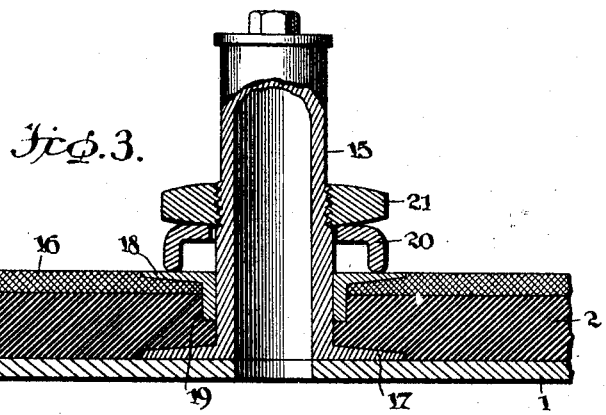
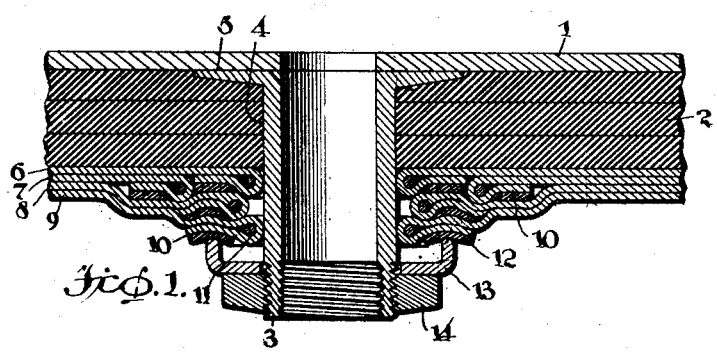
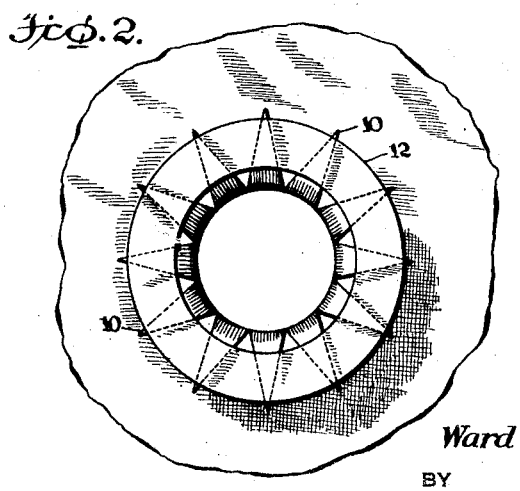
INVENTOR
Ward T. Van Orman,
BY
ATTORNEY Patented Mar. 8, 1927.

1,620,415

UNITED STATES PATENT OFFICE.

WARD T. VAN ORMAN, OF AKRON, OHIO, ASSIGNOR TO THE GOODYEAR TIRE & RUBBER COMPANY, OF AKRON, OHIO, A CORPORATION OF OHIO.

LEAKPROOF-TANK COVER.

Original application filed April 28, 1921, Serial No. 465,164. Divided and this application filed July 17, 1925. Serial No. 44,246.

My invention relates to leak-proof covers for gasoline tanks and it has particular reference to the formation of means for admitting gasoline to or draining it from the tanks.

One object of this invention is to provide a cover for gasoline tanks that will reduce fire hazards and prevent leakage of gasoline from tanks of aircraft after a crash or when the tanks are punctured by missiles, and to provide novel means for reinforcing the cover at the openings required in the tank for refilling or draining purposes.

Various other objects and advantages to be obtained from practicing my invention will be apparent from the following description and from the accompanying drawings forming a part of this specification in which:

Fig. 1 is a fragmentary cross sectional view of one wall of a tank constructed in accordance with the principles of my invention;

Fig. 2 is a fragmentary view showing the manner of forming openings in the wall of the tank; and Fig. 3 is a cross-sectional view similar to that shown by Fig. 1 illustrating another form which my invention may assume.

A detailed description of the construction of my improved tank cover as a whole is not deemed necessary as it is fully set forth in my application for Letters Patent Serial Number 465,164, filed April 28, 1921, of which this application is a division.

A cover constructed according to my invention consists of a metal tank 1 enveloped by layers of rubber compound 2 which are closely stitched together in such manner as to exclude all entrapped air that might otherwise remain between the successive layers of the composition. A hollow connection or projection 3 fits into an opening 4 and is provided with a flange 5, maintaining a tight fit between the metal portion of the tank and the rubber.

Successive layers of fabric, as indicated at 6, 7, 8 and 9, are disposed over and in close contact with the rubber 2 and are provided with tongue portions 10 formed by slitting the material radially, as indicated in Fig. 2. The tongue portions 10 of each layer of fabric are folded back from the connection 3 and a small reinforcing ring 11 of either multi or single strand wire is placed over the opening and the tongues are pulled through the ring and cemented or otherwise secured to the body of the fabric. A reinforcing fabric washer 12 is next cemented over the tongues to secure them in place between the washer 12 and the body of the fabric. A reinforcing ring is similarly attached to each layer of fabric, the successive rings being of different diameters so as to assume a staggered relationship in the assembled structure, as clearly illustrated in Fig. 1.

A cupped metal washer 13 compresses the material around the tank connection 3 and prevents leakage of gasoline therefrom in case the tank is punctured and gasoline collects in the tank cover. A nut 14 secures the washer 13 in the desired position.

The structure just described, adapted for use around a projection or connection 3, is primarily designed for application at the bottom of a gasoline tank where the contents are drained. More reinforcement is generally required at this location than at the top where danger of leakage or puncture is not so great. However it is to be understood that the same structure may be applied either at the top or bottom of the tank.

The embodiment of my invention shown in Fig. 3 illustrates the form of reinforced connection generally used at the top of the tank, through which connection the tank is refilled. This embodiment consists of an outer projection 15 and a covering comprising one or more layers of rubber 2 and fabric 16. The rubber and fabric are confined about the projection 15 between the flanges 17 and 18 formed respectively upon the members 15 and 19; the member 19 being a sleeve. A washer 20 is slidably disposed upon the projection 15 and bears against the sleeve 19 and is held in place by means of a nut 21.

I have thus devised an efficient structure at the outlet and inlet connections of a gasoline tank to prevent any escape of gasoline around the projections 3 and 15, in case of a puncture and the gasoline runs between the outer portion of the tank and the rubber composition adjacent the connection.

Various modifications of the structure illustrated may be effected without departing from the spirit and scope of my invention and I desire, therefore, that only such limitations shall be imposed as are set forth in the claims appended hereto.

What I claim is:

1. An outlet connection for a tank having a cover of fabric and rubber composition formed with reinforced openings through the fabric including a reinforcing loop, a member attached to the tank and extending through the openings, tongues formed by a series of radial cuts in said fabric pulled through said loop and a reinforcing washer fitted around the openings adapted to secure the tongues and fabric intermediate the reinforcing washer and the body of the fabric.

2. An outlet connection for a tank provided wth a stem rigidly secured thereon comprising a fabric member formed with a reinforced opening therethrough, embodying a reinforcing loop of substantially the size and shape of the desired opening, tongues formed by radial cuts in said fabric folded back from said loop and a reinforcing washer secured over the ends of said tongue to secure the latter in place.

3. A device of the class described adapted to be applied to a tank having an opening therein comprising a stem rigidly mounted to register with the opening in the tank said tank being provided with a covering of fabric and rubber composition, means slidable on said stem compressing the fabric and rubber about the opening and means including a cupped washer for holding the slidable means in adjusted position.

4. In a fuel tank having a wall covering comprising a plurality of plies of fabric and rubber, a stem extending rigidly from the tank through an opening in said fabric and rubber, the fabric plies being slit to form tongue portions adjacent the opening, a plurality of rings disposed about the stem, the tongue portions being folded over the rings and means for clamping the fabric, rubber and rings together.

5. In a fuel tank having a wall covering comprising a plurality of plies of fabric and rubber, a stem extending rigidly from the tank through an opening formed in said cover, the fabric plies being slit to form tongue portions adjacent the opening, a plurality of rings of unequal diameters disposed about the stem, the tongue portions being folded over the rings and adjustable means on the stem for holding the fabric, rubber and rings in assembled position.

6. In a gasoline tank, a tubular projection secured thereto, a layer of rubber composition fitted about the projection, a plurality of layers of fabric in close contact with the rubber composition and reinforced around the projection by means of metal rings and fabric washers and means threaded upon the projection for clamping the fabric and rubber against the tank.

In witness whereof, I have hereunto signed my name.

WARD T. VAN ORMAN.